United States Patent
Shi et al.

(10) Patent No.: US 11,089,553 B2
(45) Date of Patent: Aug. 10, 2021

(54) POWER CONTROLLING METHOD, APPARATUS AND TERMINAL

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/738,730

(22) Filed: Jan. 9, 2020

(65) Prior Publication Data

US 2020/0154362 A1    May 14, 2020

Related U.S. Application Data

(63) Continuation of application No. PCT/CN2018/101218, filed on Aug. 18, 2018.

(51) Int. Cl.
*H04W 52/14* (2009.01)
*H04W 76/27* (2018.01)
(Continued)

(52) U.S. Cl.
CPC ......... *H04W 52/146* (2013.01); *H04L 5/0051* (2013.01); *H04L 25/0226* (2013.01);
(Continued)

(58) Field of Classification Search
CPC ... H04B 7/046–7/0486; H04L 25/0224; H04L 25/0226; H04W 52/146; H04W 52/246; H04W 52/325; H04W 52/42
See application file for complete search history.

(56) References Cited

U.S. PATENT DOCUMENTS

2019/0312617 A1* 10/2019 Wernersson ........ H04L 25/0226
2019/0327693 A1* 10/2019 Rahman .............. H04W 52/146

FOREIGN PATENT DOCUMENTS

CN     101971550 A    2/2011
CN     102763463 A    10/2012
(Continued)

OTHER PUBLICATIONS

The First Office Action of corresponding Chinese application No. 201880002959.5, dated May 27, 2020.
Huawei et al.3GPP TSG RAN WG1 Meeting #92 R1-1801462, Remaining details of UL power control design, published on Mar. 2, 2018.
The EESR of corresponding European application No. 18921298.8, dated Jun. 18, 2020.
(Continued)

*Primary Examiner* — Pao Sinkantarakorn

(57) ABSTRACT

Embodiments of the present application provide a power controlling method, an apparatus and a terminal, including: receiving, by a terminal, first configuration information sent by a network device; and determining N SRS resources for a non-codebook-based uplink transmission based on the first configuration information, where the terminal supports simultaneous transmissions of M SRS resources; and if a value of the N is not divisible by the M, determining, by the terminal, P/M to be a transmitting power corresponding to each SRS resource based on a total transmitting power P of an SRS; or determining, by the terminal, P/N to be a first reference power corresponding to the each SRS resource based on the total transmitting power P of the SRS, and determining an actual transmitting power corresponding to the each SRS resource based on the first reference power and a second reference power.

18 Claims, 3 Drawing Sheets

(51) Int. Cl.
   *H04L 5/00* (2006.01)
   *H04L 25/02* (2006.01)
   *H04W 52/36* (2009.01)
   *H04W 72/00* (2009.01)
   *H04W 72/02* (2009.01)
   *H04W 72/04* (2009.01)

(52) U.S. Cl.
   CPC ....... *H04W 52/143* (2013.01); *H04W 52/367* (2013.01); *H04W 72/005* (2013.01); *H04W 72/02* (2013.01); *H04W 72/0473* (2013.01); *H04W 76/27* (2018.02)

(56) References Cited

FOREIGN PATENT DOCUMENTS

| | | |
|---|---|---|
| CN | 103401669 A | 11/2013 |
| CN | 103490872 A | 1/2014 |
| CN | 103945504 A | 7/2014 |
| CN | 107889209 A | 4/2018 |
| WO | 2013048176 A1 | 4/2013 |
| WO | 2013134891 A1 | 9/2013 |
| WO | 2014021589 A1 | 2/2014 |

OTHER PUBLICATIONS

Ericsson:"SRS power scaling in UL power control", 3GPP DRAFT; R1-1809412 SRS Power Scaling in UL power control, 3rd Generation Partnership Project (3GPP), Mobile Competence Centre; 650, Route Des Lucioles; F-06921 Sophia-Antipolis Cedex; France, vol. RAN WG1, No. Goteborg, Sweden; 20180820-20180824 Aug. 11, 2018(Aug. 11, 2018), XP051516775.

Ericsson:"SRS power scaling in UL power control", 3GPP DRAFT; R1-1807268 SRS Power Scaling in UL power control, 3rd Generation Partnership Project (3GPP), Mobile Competence Centre; 650, Route Des Lucioles; F-06921 Sophia-Antipolis Cedex; France, vol. RAN WG1, No. Busan, Korea; 20180521-20180525 May 12, 2018(May 12, 2018), XP051463001.

"3rd Generation Partnership Project; Technical Specification Group Radio Access Network; NR; Physical layer procedures for control (Release 15)", 3GPP Draft; R1-1801293 TS 38213_V1500_With Change Marks, 3rd Generation PArtnership Project (3GPP), Mobile Competence Centre; 650, Route Des Lucioles; F-06921 Sophia-Antipolis Cedex, France, Feb. 12, 2018(Feb. 12, 2018), XP051398860.

International Search Report (ISR) dated May 20, 2019 for Application No. PCT/CN2018/101218.

* cited by examiner

POWER CONTROLLING METHOD, APPARATUS AND TERMINAL

CROSS-REFERENCE TO RELATED APPLICATION

This application is a continuation of International Application No PCT/CN2018/101218, filed on Aug. 18, 2018, the disclosure of which is hereby incorporated by reference in its entirety.

TECHNICAL FIELD

Embodiments of the present application relate to the technical field of mobile communication and, in particular, to a power controlling method, an apparatus and a terminal.

BACKGROUND

There are two types of transmission schemes for a design of Multiple input Multiple Output (MIMO) transmission schemes for Physical Uplink Shared Channel (PUSCH) in New Radio (NR): Codebook-based uplink (UL) MIMO transmission and Non-codebook-based uplink (UL) MIMO transmission.

A power controlling scheme of the uplink MIMO transmission is: calculating a total power required by a Sounding Reference Signal (SRS), and then evenly distributing it on different SRS ports. For example, for a non-codebook based UL MIMO transmission, a network configures four single-potted SRSs, and a terminal calculates a total SRS power and then evenly distributes it on four SRS ports. This scheme has no problem with one single-ported SRS, two single-ported SRSs and four single-ported SRSs, but there is a problem of power allocation for three single-ported SRSs.

SUMMARY

Embodiments of the present application provide a power controlling method, an apparatus and a terminal.

A power controlling method provided by an embodiment of the present application includes:

receiving, by a terminal, first configuration information sent by a network device; and determining N SRS resources for a non-codebook-based uplink transmission based on the first configuration information, where the terminal supports simultaneous transmissions of NI SRS resources; and if a value of the N is not divisible by the M, determining, by the terminal, P/M to be a transmitting power corresponding to each SRS resource based on a total transmitting power P of an SRS; or determining, by the terminal, PIN to be a first reference power corresponding to the each SRS resource based on the total transmitting power P of the SRS, and determining an actual transmitting power corresponding to the each SRS resource based on the first reference power and a second reference power.

A power controlling apparatus provided by an embodiment of the present application includes:

a receiving unit, configured to receive first configuration information sent by a network device;

a first determining unit, configured to determine N SRS resources for a non-codebook-based uplink transmission based on the first configuration information, where the terminal supports simultaneous transmissions of M SRS resources; and a second determining unit, configured to, if a value of the N is not divisible by the M, determine P/M to be a transmitting power corresponding to each SRS resource based on a total transmitting power P of an SRS; or determine P/N to be a first reference power corresponding to the each SRS resource based on the total transmitting power P of the SRS, and determine an actual transmitting power corresponding to the each SRS resource based on the first reference power and a second reference power.

A terminal provided by an embodiment of the present application includes a processor and a memory. The memory is configured to store a computer program, and the processor is configured to call and run the computer program stored in the memory to implement the power controlling method described above.

A chip provided in an embodiment of the present application is configured to implement the power controlling method described above.

Specifically, the chip includes a processor configured to call and run a computer program from a memory to enable a device equipped with the chip to implement the power controlling method described above.

A computer readable storage medium provided by an embodiment of the present application is configured to store a computer program which enables a computer to implement the power controlling method described above.

A computer program product provided by an embodiment of the present application includes computer program instructions which enable a computer to implement the power controlling method described above.

A computer program provided by an embodiment of the present application, when run on a computer, enables the computer to implement the power controlling method described above.

With the above technical solution, a specific power controlling scheme is proposed for the non-codebook based UL MIMO transmission scheme in the NR system when the number of SRS resources configured by the network is not divisible by the number of SRS resources supported by the terminal, which may effectively adapt the implementation of a UE, and ensures effective operation of a power controlling algorithm.

BRIEF DESCRIPTION OF THE DRAWINGS

The drawings described herein are intended to provide farther understanding of the present application, and form a part thereof The illustrative embodiments and descriptions are intended to explain, rather than to form unduly limitations against, the present application. In the drawings.

DESCRIPTION OF EMBODIMENTS

Now, the technical solutions in the embodiments of the present application will be described hereunder with reference to accompanying drawings. Obviously, the described embodiments are a part of embodiments of the present application, rather than all of them, Based on the embodiments of the present application, all other embodiments obtained by persons of ordinary skill in the art without making any creative effort shall fall within the protection scope of the present application.

The technical solutions in the embodiments of the present application may be applied to various communication systems, such as Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX), a 5G system, or the like.

Figure 1:
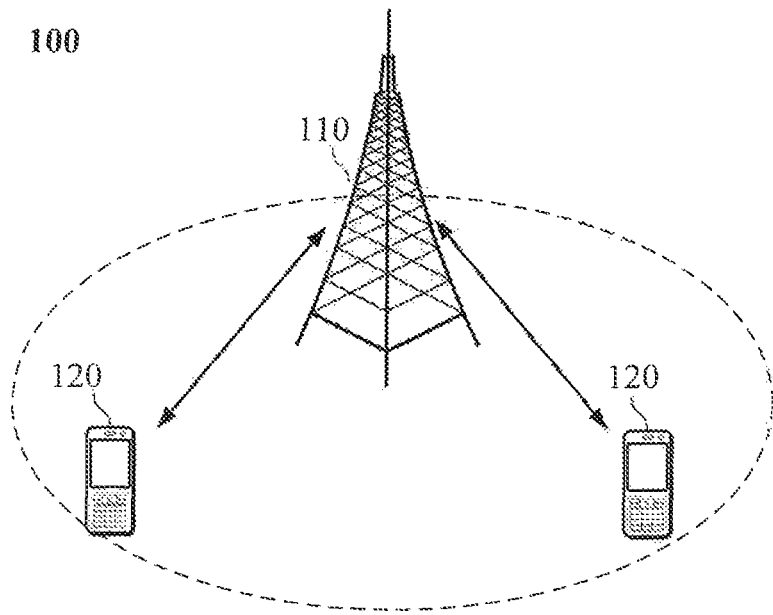
FIG. 1 is a schematic diagram of a communication system architecture provided in an embodiment of the present application.

Illustratively, a communication system 100 in which an embodiment of the present application is applied is as shown in FIG. 1. The communication system 100 may include a network device 110, which may be in communication with a terminal 120 (or referred to as a communication terminal, a terminal). The network device 110 may provide communication coverage for a specific geographical region, and may communicate with a terminal within the coverage region. In an embodiment, the network device 110 may be a base transceiver station (BTS) in the GSM system or CDMA system, or a NodeB (NB) in the WCDMA system, or an Evolutional Node B (eNB, or eNodeB) in the LTE system, or a radio controller in a cloud radio access network (GRAN). Alternatively, the network device may be mobile switching center, a relay station, an access point, an in-vehicle device, a wearable device, a hub, a switch, a bridge, a router, a network side device in a 5G network, or a network device as in a next evolved public land mobile network (PLMN).

The communication system 100 also includes at least one terminal 120 located within a coverage of the network device 110. The "Terminal" as used herein includes, but is not limited to, connected via a wired line, such as connection via a Public Switched Telephone Networks (PSTN), a Digital Subscriber Line (DSL), a digital cable, a direct cable; and/or another data connection/network; and/or via a wireless interface, such as for a cellular network, a Wireless Local Area Network (WLAN), a digital television network such as a DVB-H network, a satellite network, an AM-FM broadcast transmitter; and/or an apparatus of another terminal configured to receive/transmit a communication signal; and/or an Internet of Things (IoT) device. A terminal configured to communicate via a radio interface may be referred to as a. "wireless communication terminal", "wireless terminal" or "mobile terminal". An example of the mobile terminal includes, but is not limited to, a satellite or cellular telephone, a personal communication system (PCS) terminal that can combine cellular radio telephone, data processing, faxing and data communication capabilities, a PDA that may include a radio telephone, a pager, an Internet/Intranet access, a web browser, a note pad, calendar and/or a Global Positioning System (GPS) receiver; and a conventional laptop and/or palmtop receiver; or some other electronic device that includes a radiotelephone transceiver. The terminal may refer to an access terminal, a user equipment (UE), a subscriber unit, a subscriber station, a mobile station, a mobile table, a remote station, a remote terminal, a mobile device, a user terminal, a terminal, a radio communication device, a user agent or a subscriber apparatus.

The access terminal may be a cellular phone, a cordless phone, a session initiation protocol (SIP) phone, a wireless local loop (WLL) station, a personal digital assistant (PDA), a handset with radio communication capability, a computing device or other processing device, in-vehicle device, wearable device, a terminal in the 5G network, or a terminal as in the next evolved PLMN that is connected to a wireless modem.

In an embodiment, the terminals 120 may communicate via device to device (D2D).

In an embodiment, the 5G system or 5G network may also be referred to as new radio (NR) system or NR network.

FIG. 1 illustratively shows one network device and two terminals. In an embodiment, the communication system 100 may include more network devices, and other quantities of terminals may be included within coverage of each network device, which is not limited in embodiments of the present application.

In an embodiment, the communication system 100 may also include other network entity such as a network controller, a mobility management entity, or the like, which is not limited in embodiments of the present application.

It should be understood that a device having a communication function in a network/system in an embodiment of the present application may be referred to as a communication device. Taking the communication system 100 shown in FIG. 1 as an example, the communication device may include a network device 110 and a terminal 120 having a communication function, and the network device 110 and the terminal 120 may be specific devices as described above, which will not be repeated herein. The communication device may also include other devices in the communication system 100, for example, other network entity such as a network controller, a mobility management entity, or the like, which is not limited in embodiments of the present application.

It should be understood that, as used herein, the terms "system" and "network" may be used interchangeably. As used herein, the term "and/or" merely describes a relation between related objects, representing three possible relations. For instance, A and/or B may represent three cases: A alone, A and B together, and B alone. Additionally, as used herein, the symbol "/" typically means the related objects before and after the symbol are in a "or" relation.

In order to facilitate the understanding of the technical solutions of the embodiments of the present application, the related technology of the embodiments of the present application are described below.

There are two types of transmission schemes for the design of MIMO transmission schemes for PUSCHs in the NR:

Codebook-based UL MIMO transmission:

A UE sends a multi-ported SRS, and the network selects a specified codebook from a codebook set according to a measurement result of the SRS for informing the UE. The UE precodes data according to the specified codebook received and transmits the data.

Non-codebook-based UL MIMO transmission, which may be categorized into two modes:

Mode 1: This scheme is for a case where channel disparity is established. The UE estimates downlink channel information according to network downlink signal (with an associated Channel State Information Reference Signal (CSI-RS) being configured by the network), and calculates an uplink precoding matrix according to the downlink channel information. For example, when a UE can support uplink transmission with four ports, the UE may calculate one precoding matrix (of 4 dimensions), or four precoding vectors of one dimension. Then, the UE (sequentially or simultaneously) transmits four single-ported SRSs, where each SRS is precoded using the above precoding matrix or precoding vectors before being transmitted. The network indicates one or more SRSs according to a measurement result of the SRSs. The UE performs PUSCH transmission according to the indicated SRS. For example, the network has indicated a first SRS, and the UE transmits one layer of PUSCH, and uses a precoding that corresponds to the first SRS.

Mode 2: This scheme can be used for a case where channel disparity does not establish (and the network does not configure any associated CSI-RS at this time): antenna selection. At this time, the UE does not need a downlink (DL) Reference Signal (RS) to calculate a precoding matrix. For example, when a UE can support antenna uplink transmission, the UE may use one unit matrix (of four dimensions) (possibly with a coefficient), or four one-dimensional precoding vectors (i.e., [1 0 0 0], [0 1 0 0], [0 0 1 0], [0 0 0 1], possibly led by a coefficient). Then, the UE (sequentially or simultaneously) transmits four single-ported SRSs, where each SRS is precoded using the above precoding matrix or precoding vectors before being transmitted. The network indicates one or more SRSs according to a measurement result of the SRSs. The UE performs PUSCH transmission according to the indicated SRS. For example, the network has indicated a first SRS, and the UE transmits one layer of PUSCH, and uses a precoding that corresponds to the first SRS.

An existing power controlling scheme is: calculating a total power required by the SRS, and then evenly distributing it on different SRS ports. For example, for Mode 2 (antenna selection) in the Non-codebook based UL MIMO transmission, four single-ported SRSs are configured, a total SRS power is calculated and then evenly distributed on four SRS ports. This scheme has no problem with one single-ported SRS, two single-ported SRSs and four single-ported SRSs, but there is a problem for three single-ported SRSs. Examples are as follows:

A UE has four transmitting antennas, a total power is P_max, and a transmitting power of each antenna is P_max/4.

If the network configures one single-ported SRS, the UE can virtualize four antennas as one port. Since the total power of the SRS will not exceed a maximum transmitting power, there is no problem with the above power allocation.

If the network configures two single-ported SRSs, the UE can virtualize four antennas as two ports. Since the total power of the SRSs will not exceed the maximum transmitting power, thus maximum transmitting powers of each port will not exceed ½ of the maximum transmitting power, one port virtualized from two antennas can support up to P_max/2, and there is no problem with the above power allocation.

If the network configures four single-ported SRSs, the UE can associate four antennas with four ports. Since the total power of the SRS will not exceed the maximum transmitting power, thus a maximum transmitting power of each port will not exceed ¼ of the maximum transmitting power, and there is still no problem with the above power allocation.

If the network configures three single-ported SRSs, the UE can associate three antennas with three ports (leaving one unused), or associate two antennas with two ports and virtualizes the other two antennas as one port. Since the total power of the SRS will not exceed the maximum transmitting power, thus a maximum transmitting power of each port will not exceed ⅓ of the maximum transmitting power. However, a maximum transmitting power of one port formed by one antenna is only ¼ of the transmitting power, there is, therefore, a problem with the above power allocation at this time.

In embodiments of the present application, if the network side is configured for the case with one, two or four single-ported SRSs, the existing protocol can be used. Modifications are introduced in embodiments of the present application for the case with three single-ported SRSs.

Figure 2:
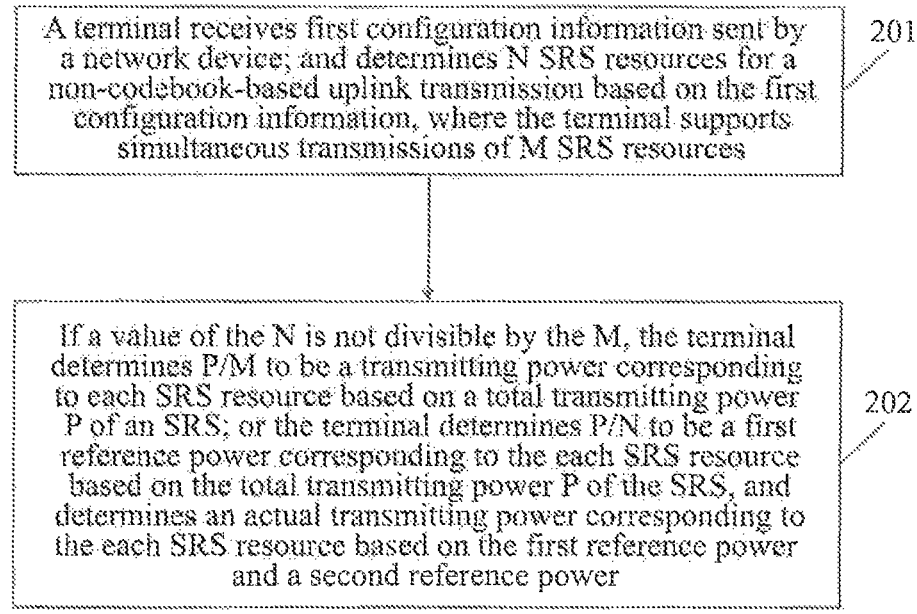
FIG. 2 is a flowchart of a power controlling method provided in an embodiment of the present application.

FIG. 2 is a flowchart of a power controlling method provided in an embodiment of the present application. As shown in FIG. 2, the power controlling method includes the following steps:

Step 201: a terminal receives first configuration information sent by a network device; and determines N SRS resources for a non-codebook-based uplink transmission based on the first configuration information, where the terminal supports simultaneous transmissions of M SRS resources.

In an embodiment of the present application, the terminal may be any device capable of communicating with a network, such as a mobile phone, a tablet computer, an in-vehicle terminal, a notebook, or the like.

In an embodiment of the present application, the network device may be a base station, such as a gNB in 5G.

In an embodiment of the present application, the terminal may receive the first configuration information sent by the network device via a system broadcasting or a Radio Resource Control (RRC) signaling, where the first configuration information is configured to configure N SRS resources for the terminal to use in non-codebook-based uplink transmission. Considering that the terminal supports simultaneous transmissions of M SRS resources, the N is hence a positive integer less than or equal to the M.

In an embodiment of the present application, the fact that the terminal supports simultaneous transmissions of M SRS resources may he understood as that the terminal has M uplink transmitting antennas, each of which can separately transmit one SRS resources as one port. Of course, two or more uplink transmitting antennas can be virtualized as one port to transmit one SRS resource. Those skilled should understand that, in the embodiment of the present application, the N SRS resources configured by the network side based on the first configuration information refer to single-ported SRS resources.

Step 202: if a value of the N is not divisible by the M, the terminal determines P/M to be a transmitting power corresponding to each SRS resource based on a total transmitting power P of an SRS; or the terminal determines P/N to be a first reference power corresponding to the each SRS resource based on the total transmitting power P of the SRS, and determines an actual transmitting power corresponding to the each SRS resource based on the first reference power and a second reference power.

In an embodiment of the present application, the value of the N being not divisible by the M includes: in a case where a value of the M is 4, the value of the N is 3. In this case, the embodiment of the present application proposes the following power controlling scheme:

Scheme 1: the terminal determines P/M to be the transmitting power corresponding to the each SRS resource based on the total transmitting power P of the SRS.

For example, if one UE supports simultaneous transmissions of M=4 SRS resources, the network configures three single-ported SRS resources for Non-codebook-based PUSCH transmission. The terminal calculates the total power P of the SRS transmission according to a relevant configuration, and a transmitting power of each single-ported SRS resource is P/X=P/4.

Scheme 2: the terminal determines P/N to be the first reference power corresponding to the each SRS resource based on the total transmitting power P of the SRS, and determines the actual transmitting power corresponding to the each SRS resource based on the first reference power and the second reference power.

Further, the terminal uses a minimum value between the first reference power and the second reference power as the actual transmitting power of the each SRS resource.

In an embodiment, the second reference power is a maximum transmitting power corresponding to each antenna.

For example, if one UE supports simultaneous transmissions of M=4 SRS resources, the network configures three single-ported SRS resources for Non-codebook-based PUSCH transmission. The terminal calculates the total power P of the SRS transmission according to a relevant configuration, and the SRS resource of each single port get an equal shared transmitting power of PR. Then, according to a relationship between P/3 and a maximum transmitting power P_max_antenna_i of each antenna, the actual transmitting power of each single-ported SRS resource is determined to be min (P/3, P_max_antenna_i), where "min" represents a smaller value (minimum value) of the two parameters in the trailing brackets.

In specific applications, if the network configures three single-ported SRSs, the UE associates two antennas with two ports (i.e., port 0 and port 1), and the other two antennas are virtualized as one port (i.e., port 2). Based on the above solution, actual transmitting powers of the port 0, port 1 and port 2 will not exceed ¼ of P_max.

In another embodiment, the second reference power is a maximum transmitting power corresponding to each port. Here, the each SRS resource is associated with one port, the one port is in turn associated with at least one antenna.

For example, if one UE supports simultaneous transmissions of M=4 SRS resources, the network configures three single-ported SRS resources for Non-codebook-based PUSCH transmission. The terminal calculates the total power P of the SRS transmission according to a relevant configuration, and the SRS resources of each single port get an equal shared transmitting power of P/3. Then, according to a relationship between P/3 and a maximum transmitting power P_max_port_i of each port, the actual transmitting power is determined to be min (P/3, P_max_port_i), where "min" represents a smaller value (minimum value) of the two parameters in the trailing brackets.

In specific applications, if the network configures three single-ported SRSs, the UE associates two antennas with two ports (i.e., port 0 and port 1), and the other two antennas are virtualized as one port (i.e., port 2). Based on the above solution, actual transmitting powers of the port 0 and port 1 will not exceed ¼ P_max, but an actual transmitting power of port 2 will not exceed ½ P_max.

The technical solution in the embodiment of the present application further includes the following case: if the value of the N is divisible by M, the terminal determines P/N to be the transmitting power corresponding to the each SRS resource based on the total transmitting power P of the SRS. For example, in a case where a value of M is 4, the value of the N is 1, 2, or 4.

For the network side, if one UE supports simultaneous transmissions of M=4 SRS resources, the network will only configure one, two or four, rather than three, SRS resources for Non-codebook-based PUSCH transmission. Thus, the terminal side calculates the total power P of the SRS transmission according to a relevant configuration, and a transmitting power of each single-ported SRS resource is P/N, such as P, P/2 or P/4.

Figure 3:
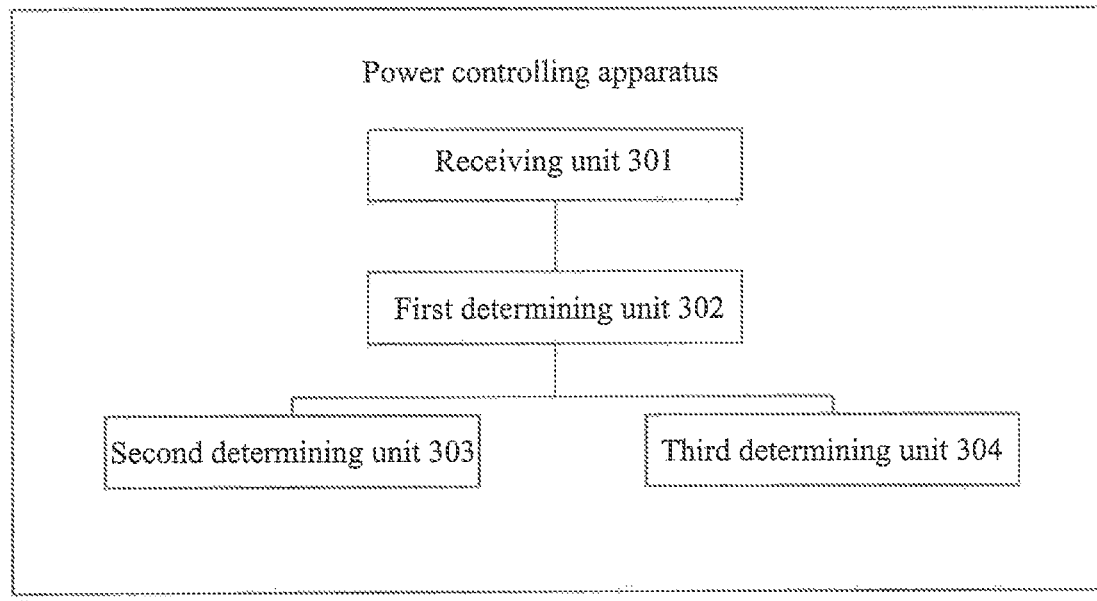
FIG. 3 is a schematic structural diagram of a power controlling apparatus provided in an embodiment of the present application.

FIG. 3 is a schematic structural diagram of a power controlling apparatus provided in an embodiment of the present application. As shown in FIG. 3, the power controlling apparatus shown includes:

a receiving unit 301, configured to receive first configuration information sent by a network device;

a first determining unit 302, configured to determine N SRS resources for a. non-codebook-based uplink transmission based on the first configuration information, where the terminal supports simultaneous transmissions of M SRS resources; and a second determining unit 303, configured to, if a value of the N is not divisible by the M, determine P/M to be a transmitting power corresponding to each SRS resource based on a total transmitting power P of an SRS; or determine P/N to be a first reference power corresponding to the each SRS resource based on the total transmitting power P of the SRS, and determine an actual transmitting power corresponding to the each SRS resource based on the first reference power and a second reference power.

In an embodiment, the second determining unit 303 is configured to use a minimum value between the first reference power and the second reference power as the actual transmitting power of the each SRS resource.

In an embodiment, the second reference power is a maximum transmitting power corresponding to each antenna; or the second reference power is a maximum transmitting power corresponding to each port.

In an embodiment, the each SRS resource is associated with one port, the one port is in turn associated with at least one antenna.

In an embodiment, the value of the N being not divisible by the M includes:

in a case where a value of M is 4, the value of the N is 3.

In an embodiment, the apparatus further includes:

a third determining unit 304, configured to: if the value of the N is divisible by the M, determine P/N to be the transmitting power corresponding to the each SRS resource based on the total transmitting power P of the SRS.

In an embodiment, the value of the N being divisible by the M includes:

in a case where a value of M is 4, the value of the N is 1, 2, or 4.

Those skilled should understand that the foregoing descriptions related to the power controlling apparatus of the embodiments of the present application can be understood by referring to the related descriptions of the power controlling method of an embodiment of the present application.

Figure 4:
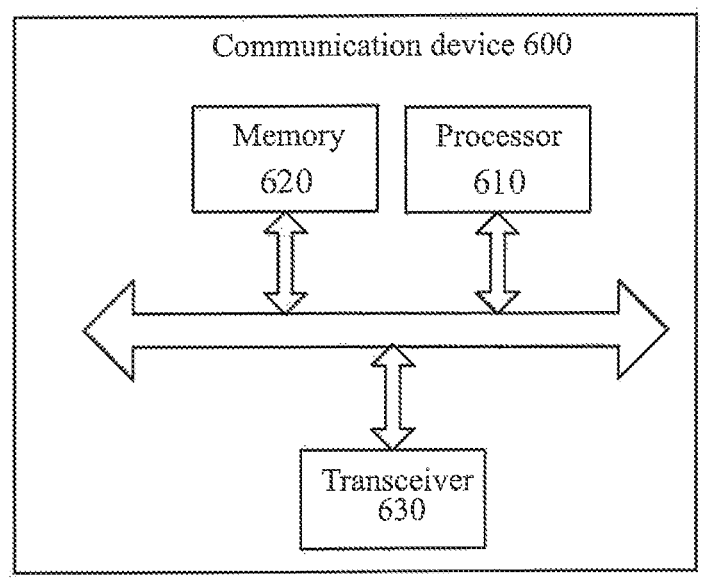
FIG. 4 is a schematic structural diagram of a communication device provided in an embodiment of the present application.

FIG. 4 is a schematic structural diagram of a communication device 600 provided in an embodiment of the present application. The communication device may he a terminal. The communication device 600 shown in FIG. 4 includes a processor 610 which can call and run a computer program from the memory to implement the methods in embodiments of the present application.

In an embodiment, as shown in FIG. 4, the communication device 600 may further include a memory 620. The processor 610 can call and run a computer program from the memory 620 to implement the methods in embodiments of the present application.

The memory 620 may be a separate device independent of the processor 610 or may be integrated in the processor 610.

In an embodiment, as shown in FIG. 4, the communication device 600 may further include a transceiver 630, and the processor 610 can control the transceiver 630 to communicate with other devices and, in particular, may control the transceiver 630 to send/receive information or data to/from other devices.

The transceiver 630 may include a transmitter and a receiver. The transceiver 630 may further include an antenna, and the number of the antenna may he one or more.

In an embodiment, the communication device 600 may specifically be the network device in the embodiments of the present application, and the communication device 600 can implement corresponding processes implemented by the network device in the methods of the embodiments of the present application, which, for conciseness, will not be repeated herein.

In an embodiment, the communication device 600 may specifically be the mobile terminal/terminal in the embodiments of the present application, and the communication device 600 can implement corresponding processes implemented by the mobile terminal/terminal in the methods of the embodiments of the present application, which, for the sake of conciseness, will not be repeated herein.

Figure 5:
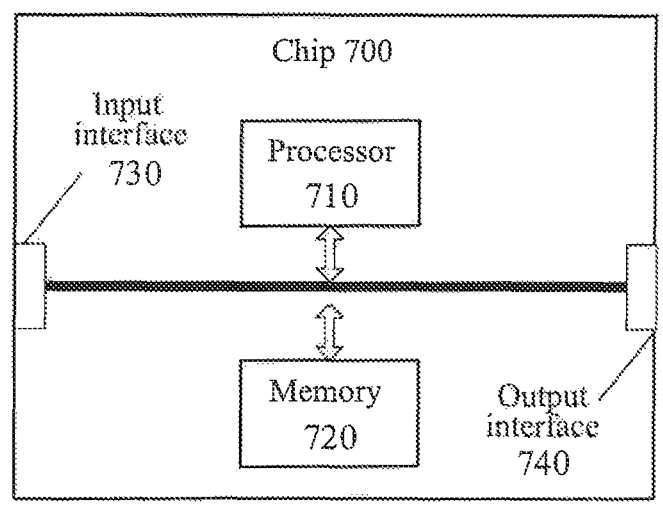
FIG. 5 is a schematic structural diagram of a chip according to an embodiment of the present application.

FIG. 5 is a schematic structural diagram of a chip according to an embodiment of the present application. The chip 700 shown in FIG. 5 includes a processor 710 which can call and run a computer program from a memory to implement the methods in embodiments of the present application.

In an embodiment, as shown in FIG, 5, the chip 700 may further include a memory 720. The processor 710 can call and run a computer program from the memory 720 to implement the methods in embodiments of the present application.

The memory 720 may be a separate device independent of the processor 710 or may be integrated in the processor 710.

In an embodiment, the chip 700 may also include an input interface 730. The processor 710 can control the input interface 730 to communicate with other devices or chips. Specifically, information or data sent by other devices or chips can be acquired.

In an embodiment, the chip 700 may also include an output interface 740. The processor 710 can control the output interface 740 to communicate with other devices or chips. Specifically, information or data can be output to other devices or chips.

In an embodiment, the chip can be applied to the network device in the embodiments of the present application, and the chip can implement corresponding processes implemented by the network device in the methods in the embodiments of the present application, which, for the sake of conciseness, will not be repeated herein.

In an embodiment, the chip can be applied to the mobile terminal/terminal in the embodiments of the present application, and the chip can implement corresponding processes implemented by the mobile terminal/terminal in the methods of the embodiments of the present application, which, for the sake of conciseness, will not be repeated herein.

It should be understood that the chip mentioned in the embodiment of the present application may also be referred to as a system level chip, a system chip, a chip system or a system on chip, or the like.

Figure 6:
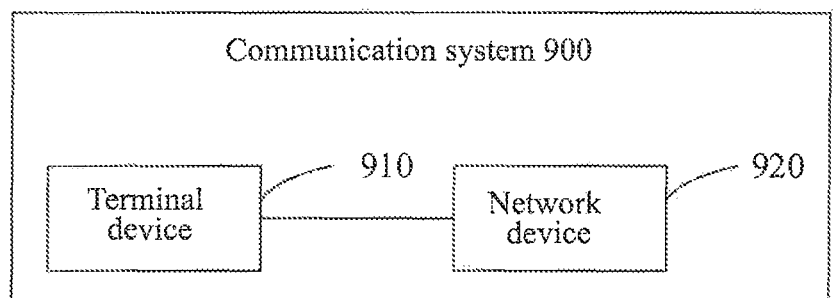
FIG. 6 is a schematic block diagram of a communication system provided in an embodiment of the present application.

FIG. 6 is a schematic block diagram of a communication system 900 provided in an embodiment of the present application. As shown in FIG. 6, the communication system 900 includes a terminal device 910 and a network device 920.

The terminal device 910 can be configured to implement the corresponding function implemented by the terminal in the above methods, and the network device 920 can be configured to implement the corresponding function implemented by the network device in the above methods, which, for conciseness, will not be repeated herein.

It should be understood that a processor in an embodiment of the present application may be an integrated circuitry chip capable of processing a signal. In the implementation process, each step of the above method embodiments may be accomplished by an integrated logic circuit of hardware in a processor, or instructions in the form of software. The processor may be a general-purpose processor, a digital signal processor (DSP), an application specific integrated circuit (ASIC), a field programmable gate array (FPGA), or other programmable logic devices, discrete gates or transistor logic devices or discrete hardware components. The methods, steps, and logical block diagrams disclosed in the embodiments of the present application can be implemented or executed. The general purpose. processor may be a microprocessor, or the processor may also be any conventional processor or the like. The steps of the method disclosed with reference to the embodiments of the present application may be directly embodied as being accomplished by the execution of the hardware decoding processor or by a combination of hardware and software modules in the processor. The software module may be located in a storage medium readily available in the art, such as a random access memory, a flash memory; a read only memory, a programmable read only memory or an electrically erasable programmable memory, a register, or the like. The storage medium is located in the memory. The processor reads information in the memory and accomplishes the steps of the above methods in combination with the hardware.

It can be understood that the memory in the embodiments of the present application may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM) or a flash memory. The volatile memory can be a random access memory (RAM) that acts as an external cache. By way of example rather than limitation, RAM of many forms are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the system and method described herein are intended to include, rather than being limited to, these and any other suitable types of memories.

It should be understood that the foregoing memories are examples rather than limitations. For instance, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DR RAM), or the like, That is, the memories in the embodiments of the present application are intended to include, rather than being limited to, these and any other suitable types of memories.

A computer readable storage medium is also provided by an embodiment of the present application for storing a computer program.

In an embodiment, the computer readable storage medium can be applied to the network device in the embodiments of the present application, and the computer program enables a computer to implement corresponding processes implemented by the network device in the methods in the embodiments of the present application, which, for the sake of conciseness, will not be repeated herein.

In an embodiment, the computer readable storage medium can be applied to the mobile terminal/terminal in the embodiments of the present application, and the computer program enables a computer to implement corresponding processes implemented by the mobile terminal/terminal in the methods in the embodiments of the present application, which, for the sake of conciseness, will not be repeated herein.

A computer program product is also provided by an embodiment of the present application, including computer program instructions.

In an embodiment, the computer program product can be applied to the network device in the embodiments of the present application, and the computer program instructions enable a computer to implement corresponding processes implemented by the network device in the methods in the embodiments of the present application, which, for the sake of conciseness, will not be repeated herein.

In an embodiment, the computer program product can be applied to the mobile terminal/terminal in the embodiments of the present application, and the computer program instructions enable a computer to implement corresponding processes implemented by the mobile terminal/terminal in the methods in the embodiments of the present application, which, for the sake of conciseness, will not be repeated herein.

A computer program is also provided by an embodiment of the present application.

In an embodiment, the computer program can be applied to the network device in the embodiments of the present application, and the computer program, when executed on a computer, enables the computer to implement corresponding processes implemented by the network device in the methods in the embodiments of the present application, which, for the sake of conciseness, will not be repeated herein.

In an embodiment, the computer program can be applied to the mobile terminal/terminal in the embodiments of the present application, and the computer program, when executed on a computer, enables the computer to implement corresponding processes implemented by the mobile terminals/terminals in the methods in the embodiments of the present application, which, for the sake of conciseness, will not be repeated herein.

Those of ordinary skill in the art may realize that, units and algorithm steps in various examples as described in combination with the embodiments disclosed herein may be implemented using electronic hardware, or a combination of computer software and electronic hardware. Whether the functions are to be implemented by means of hardware or software would depend on a specific application of the technical solution and a design constraint. Those skilled in the art may implement the functions described using different approaches for individual applications, but such implementation should not be deemed as beyond the scope of the present application.

Those skilled in the art may clearly appreciate that, for the purpose of convenience and conciseness in the description, the specific operating process of the systems, devices and units described above may be reference to the corresponding processes in the foregoing method embodiments, which will not be repeated herein.

In the embodiments provided in the present application, it should be understood that the disclosed systems, apparatus and methods may be implemented by other means. For instance, the apparatus embodiments described above are merely illustrative. For instance, the division of the unit is only a logical function division, and there may be other division ways in actual implementation. For instance, multiple units or components may be combined, or be integrated with another system, or some features may be omitted or not executed. In addition, inter-coupling or direct coupling or communication connectivity shown or discussed herein may be an indirect coupling or communication connection via some interfaces, apparatuses or units, and may be electrical, mechanical or otherwise.

The units described as separate components may or may not be physically separated, and the components shown as a unit may or may not be a physical unit, that is, they may be located at one place, or may be distributed to multiple network elements. Some or all of the units may be selected according to actual needs to achieve the purpose of the solution of the embodiments.

In addition, various functional units in various embodiment of the present application may be integrated into a processing unit, or each unit may physically exist, or two or more units may be integrated into one unit.

When the function is implemented in the form of the software functional unit and traded or used as a standalone product, it may be stored in a computer readable storage medium. Based on such understanding, the essence, or the part contributing to prior art, or part, of the technical solution of the present application may embody in the form of software product. The computer software product described above is stored in a storage medium and includes instructions for causing a computing device (which may be a personal computer, a server, or a network device, or the like) to implement some or all of the steps in the methods of the various embodiments of the present application. The storage medium includes various medium that can store program codes, such as a USB disk, a portable hard disk, a read-only memory (ROM), a random access memory (RAM), a magnetic disk, or an optical disk, or the like.

The above descriptions are merely specific implementations of the present application, and the protection scope of the present application shall by no means be limited thereto. Any one skilled in the art may, within the technical scope disclosed in the present application, readily think of other variations or substitutions which shall also fall within the protection scope of the present application. Therefore, the protection scope of the present application shall be in accordance with the protection scope of the claims.

What is claimed is:

1. A power controlling method, comprising:
receiving, by a terminal, first configuration information sent by a network device; and determining N sounding reference signal (SRS) resources for a non-codebook-based uplink transmission based on the first configuration information, wherein the terminal supports simultaneous transmissions of M SRS resources; and
if a value of the N is not divisible by the M, determining, by the terminal, P/N to be a first reference power corresponding to the each SRS resource based on the total transmitting power P of the SRS, and determining an actual transmitting power corresponding to the each SRS resource based on the first reference power and a second reference power;

wherein the determining an actual transmitting power corresponding to the each SRS resource based on the first reference power and a second reference power comprises:
using, by the terminal, a minimum value between the first reference power and the second reference power as the actual transmitting power of the each SRS resource.

2. The method according to claim 1, wherein the second reference power is a maximum transmitting power corresponding to each antenna; or
the second reference power is a maximum transmitting power corresponding to each port.

3. The method according to claim 2, wherein the each SRS resource is associated with one port, the one port is in turn associated with at least one antenna.

4. The method according to claim 1, wherein the value of the N being not divisible by the M comprises:
in a case where a value of the M is 4, the value of the N is 3.

5. The method according to claim 1, further comprising:
if the value of the N is divisible by the M, determining, by the terminal, P/N to be the transmitting power corresponding to the each SRS resource based on the total transmitting power P of the SRS.

6. The method according to claim 5, wherein the value of the N being divisible by the M comprises:
in a case where a value of the N is 4, the value of the M is 1, 2, or 4.

7. The method according to claim 1, wherein the receiving, by a terminal, first configuration information sent by a network device comprises:
receiving, by the terminal, the first configuration information sent by the network device via a system broadcasting or a radio resource control (RRC) signaling.

8. The method according to claim 1, wherein the N is a positive integer less than or equal to the M.

9. A non-transitory computer readable storage medium, configured to store a computer program which enables a computer to implement the method according to claim 1.

10. A terminal, comprising: a transceiver, a memory, a processor, and a computer program stored on the memory and operable on the processor,
wherein the processor, when running the computer program, is configured to:
control the transceiver to receive first configuration information sent by a network device;
determine N sounding reference signal (SRS) resources for a non-codebook-based uplink transmission based on the first configuration information, wherein the terminal supports simultaneous transmissions of M SRS resources; and
if a value of the N is not divisible by the M, determine P/N to be a first reference power corresponding to the each SRS resource based on the total transmitting power P of the SRS, and determine an actual transmitting power corresponding to the each SRS resource based on the first reference power and a second reference power;
wherein the processor is further configured to use a minimum value between the first reference power and the second reference power as the actual transmitting power of the each SRS resource.

11. The terminal according to claim 10, wherein the second reference power is a maximum transmitting power corresponding to each antenna; or
the second reference power is a maximum transmitting power corresponding to each port.

12. The terminal according to claim 11, wherein the each SRS resource is associated with one port, the one port is in turn associated with at least one antenna.

13. The terminal according to claim 12, wherein the value of the N being divisible by the M comprises:
in a case where a value of N is 4, the value of the M is 1, 2, or 4.

14. The terminal according to claim 10, wherein the value of the N being not divisible by the M comprises:
in a case where a value of M is 4, the value of the N is 3.

15. The terminal according to claim 10, the processor is further configured to:
if the value of the N is divisible by the M, determine P/N to be the transmitting power corresponding to the each SRS resource based on the total transmitting power P of the SRS.

16. The terminal according to claim 10, wherein the processor is further configured to control the transceiver to receive the first configuration information sent by the network device via a system broadcasting or a radio resource control (RRC) signaling.

17. The terminal according to claim 10, wherein the N is a positive integer less than or equal to the M.

18. The terminal according to claim 10, wherein the network device is a base station.

* * * * *